United States Patent
Roussie

(10) Patent No.: US 11,761,306 B2
(45) Date of Patent: Sep. 19, 2023

(54) ASSEMBLY WITH TIGHTLY CONTROLLED AXIAL GAP FOR THREADED CONNECTOR INSULATION ON VACUUM INSULATED TUBING

(71) Applicant: VALLOUREC TUBE-ALLOY, LLC, Houston, TX (US)

(72) Inventor: Gabriel Roussie, Boulogne-Billancourt (FR)

(73) Assignee: VALLOUREC TUBE-ALLOY, LLC, Houston, TX (US)

( * ) Notice: Subject to any disclaimer, the term of this patent is extended or adjusted under 35 U.S.C. 154(b) by 137 days.

(21) Appl. No.: 17/218,460

(22) Filed: Mar. 31, 2021

(65) Prior Publication Data

US 2021/0310332 A1    Oct. 7, 2021

Related U.S. Application Data

(60) Provisional application No. 63/003,424, filed on Apr. 1, 2020.

(51) Int. Cl.

| | |
|---|---|
| *E21B 36/00* | (2006.01) |
| *E21B 17/042* | (2006.01) |
| *F16L 59/18* | (2006.01) |
| *F16L 59/15* | (2006.01) |
| *F16L 15/08* | (2006.01) |

(52) U.S. Cl.
CPC .......... *E21B 36/003* (2013.01); *E21B 17/042* (2013.01); *F16L 15/08* (2013.01); *F16L 59/15* (2013.01); *F16L 59/18* (2013.01)

(58) Field of Classification Search
CPC ....... F16L 15/08; F16L 59/065; F16L 59/075; F16L 59/06; E21B 36/003; E21B 17/042

USPC .......................................................... 285/904
See application file for complete search history.

(56) References Cited

U.S. PATENT DOCUMENTS

| | | | |
|---|---|---|---|
| 3,763,935 A | 10/1973 | Perkins | |
| 3,885,595 A * | 5/1975 | Gibson | ................ F16L 59/188 |
| | | | 138/155 |
| 4,415,184 A | 11/1983 | Stephenson et al. | |
| (Continued) | | | |

OTHER PUBLICATIONS

International Search Report and Written Opinion of the International Searching Authority dated Jun. 23, 2021 in PCT/US 21/251713, 15 pages.

*Primary Examiner* — David Bochna
(74) *Attorney, Agent, or Firm* — Oblon, McClelland, Maier & Neustadt, L.L.P.

(57) ABSTRACT

An insulated tubular assembly includes jointed insulated tubing segments, all with inner and outer tubes concentrically disposed about in order to define a vacuum annulus in between and closed at both ends by annular bridges. Insulated tubing segment are provided with either male or female threads to threadably engage and form a joint directly with each other or through a coupling jointed to adjacent insulated tubing segments. An insulating sleeve held around such joint includes a first tubular shell adapted to cover at least part of one insulated tubular segment and a second tubular shell overlapping either internally or externally part of the first tubular shell, such that the second tubular shell extends axially about the threaded joint from one annular bridge to the adjacent one, with high tolerances on lengths of the insulated tubing segment extension extending beyond their respective annular bridges.

19 Claims, 6 Drawing Sheets

(56) References Cited

U.S. PATENT DOCUMENTS

| | | | |
|---|---|---|---|
| 4,480,371 A * | 11/1984 | McStravick | E21B 36/003 |
| | | | 285/47 |
| 4,518,175 A | 5/1985 | Richards et al. | |
| 4,538,834 A | 9/1985 | Brady et al. | |
| 4,621,838 A | 11/1986 | Kneidel et al. | |
| 4,635,967 A | 1/1987 | Stephenson | |
| 4,673,652 A * | 6/1987 | McStravick | E21B 36/003 |
| | | | 436/39 |
| 4,926,949 A * | 5/1990 | Forrest | E21B 36/003 |
| | | | 175/324 |
| 5,862,866 A * | 1/1999 | Springer | E21B 36/003 |
| | | | 166/57 |
| 7,207,603 B2 | 4/2007 | Segreto | |
| 7,845,373 B2 | 12/2010 | Hickman et al. | |
| 8,998,267 B2 * | 4/2015 | Prescott | F16L 7/02 |
| | | | 285/47 |
| 2004/0178626 A1 | 9/2004 | Segreto | |
| 2020/0393065 A1 * | 12/2020 | Hargrave | E21B 17/04 |

* cited by examiner

ASSEMBLY WITH TIGHTLY CONTROLLED AXIAL GAP FOR THREADED CONNECTOR INSULATION ON VACUUM INSULATED TUBING

CROSS-REFERENCE TO RELATED APPLICATIONS

This application claims priority to U.S. Patent Provisional Application No. 63/003,424, filed on Apr. 1, 2020; the entire content of the foregoing is incorporated herein by reference.

FIELD OF THE INVENTION

This invention relates to insulated pipe strings for use in hydrocarbon recovery wells. More particularly, this invention relates to tubular assembly made of inner and outer tubes forming insulated segments and having an improved insulated joint between those insulated tubular segments.

Hydrocarbon recovery wells for producing oil and gas involve using long tubing strings to convey the hydrocarbons from the downhole reservoir to the surface. In many instances it is desirable to maintain temperature and minimize heat loss from substances flowing through the string. In more conventional oil recovery operations, the oil may already be highly flowable within the reservoir. Nevertheless, because the viscosity of oil increases as it cools, minimizing heat loss helps the oil maintain flowability, making it easier and less costly to produce.

In some recovery operations, however, oil may be very viscous within the reservoir. It may then be necessary to heat the oil downhole in order to produce it in economically viable quantities. Minimizing heat loss in the string is therefore more critical. In these situations, hot steam is typically passed downhole through the tubing string to release the thickened or trapped oil, so it becomes flowable. Insulated tubing strings minimize heat loss from the steam and oil.

BACKGROUND OF THE INVENTION

Insulated tubing strings involves stringing together double-walled insulated tubing segments. U.S. Pat. No. 3,763,935 discloses one type of insulated tubing string wherein insulated tubing segments are joined to one another by each threading into a separate conventional sleeve type coupling which is well known in the art. Generally, each insulated tubing segment has an outer tube disposed about an inner tube and defining an annular space therebetween. The annular space is sometimes filled with insulating material. Alternatively, a vacuum may be established in the annulus to insulate the tubing. Heat transfer is therefore minimized between the inner wall, which may be exposed to hot oil and steam, and the outer wall, which may be exposed to the cooler interior of the well bore or to atmosphere.

The primary purpose of such insulated pipes is to dramatically reduce heat transfer via convection, conduction and radiation between inner and outer tubes.

A major problem with joining insulated tubing segments is that excessive heat loss may occur at the joint between segments. One of the inner or the outer pipes is smaller in length in order to allow the longer of the inner or the outer to be machined and provided with either pin or box member, pin and box member are needed to thread insulated tubing segments together to form joints all along the Insulated tubing string. But then at the joint location, there is what we could call a single-walled tubing, which can't provide the same insulation as double-walled insulated tubing segments. Insulated tubing segments are not insulated at their ends.

Heat may therefore be conducted away from the interior of the tubing along a conductive flow path at each joint, at a much higher rate than through the insulated portion of the tube. This results in greater heat loss and reduced efficiency.

Several solutions have been proposed to minimize heat loss at the joint between insulated tubing segments.

U.S. Pat. No. 4,518,175 discloses an insulated tubular assembly comprising a very specific coupling arrangement joined in between insulated tubing segments. The specific coupling is threaded in order to be jointed with the shortest of the inner and the outer pipe at both ends. A gap Is defined by an inner peripheral surface of the specific coupling, free ends of the longest of the inner and the outer pipe, and an additional inner ring is welded to both of the adjacent free ends of those longest of the longest of the inner and the outer pipe. An insulation material is filled in the gap. U.S. Pat. No. 4,518,175 provides a continuous insulation along the tubular assembly, minimizing heat loss at the joint.

The above insulating tubing joints and methods have the drawback that the insulation at the joint is fitted internal to the coupler. Applying insulation during the manufacture of each tubing segment in this way can be complicated and expensive. For example, the insulation must be installed so the coupler will later fit around it when joining two insulated tubing segments. If the coupler does not fit properly during installation, it may not be correctable in the field during installation, while away from the manufacturing facility. If the insulation is instead applied in the field during installation, this can be a complicated or time-consuming step.

Another complication with the above tubing joints is that it may be difficult or impossible to repair or replace the insulation once in the field. Whether the insulation needs replacement may be difficult or impossible to discern, because it is hidden within the joint. Especially in a long tubing string, a great deal of effort is required to break apart each joint whose insulation needs inspection or repair.

Thus to improve repair on site without the need to break apart a string, it is known from U.S. Pat. No. 7,845,373 an insulator adapted to surround the joint and a latching joint protector adapted to surround the insulator and hold the insulator against the joint. Such insulator is pretended being capable of reducing heat loss through the joints of vacuum insulated tubing strings by 95%. That solution is expensive, increases the outer diameter of the pipe string and is not providing fully satisfactory insulation results.

To minimize the costs and provide another balance between costs and insulation efficiency, it is known from U.S. Pat. No. 7,207,603 to only add an annular insulator polypropylene sleeve at the time of makeup of insulated tubing segments. In order to lower cost, such sleeve is produced in large quantity, with dimension able to approximately fits all sizes. Such sleeve is not adapted to a specific connection type, but only to an outer diameter of those insulated tubing segments. But as there are production tolerances, and a need for an extra length at the pipe ends allowing recut and rethreading of threaded parts for insulated tubing segments, it happens that there is frequently an axial gap not covered by such sleeve between adjacent insulated tubing segments. While providing a very low-cost solution to heat transfer reduction at the joint location, U.S. Pat. No. 7,207,603 solution is not enough satisfactory in terms of heat transfer reduction, especially when considering that insulated tubing segments have production tolerances.

The disadvantages of the prior art are overcome by the present invention. An insulated tubular assembly is provided having an improved insulated joint that is easier and less expensive to manufacture, install, repair, recut, rethread and replace.

There is a need to improve heat transfer at the coupling area without increasing costs of such insulating means, and without rendering coupling of an insulated pipe strings more difficult to place, while still able to maintain quite an homogeneous insulation solution for the whole range of accepted values, including extreme value within the whole range of accepted values in terms of outer diameter, inner diameter and or length of the respective inner and outer tubing, and consequently length of the free ends of the longest of the inner and outer tubing of such insulated tubing segments.

SUMMARY OF THE INVENTION

An insulated tubular assembly is disclosed for passing fluids within a hydrocarbon recovery well. The tubular assembly is formed by stringing together double-walled tubing segments. The tubular assembly has an improved insulated joint between tubing segments, making the tubular assembly easier and less expensive to manufacture, install, repair, and replace.

In a preferred embodiment, the assembly includes a plurality of consecutively joined insulated tubing segments. Each tubing segment includes an inner tube, an outer tube, and two opposing ends. Opposing ends may either be of the inner tube or the outer tube depending which of the inner tube or the outer tube is longer than the other. The longer of the inner and outer tube is forming an extension extending outwardly at least at one end of the first insulated tubing segment, and preferably at both opposing ends.

An inner tube defines an inner passage for conveying fluids. An outer tube is concentrically disposed about the inner tube, and an annulus is defined between the inner and outer tubes. An annular bridge at each end connects the inner tube to the outer tube. Together, the annular bridges seal the annulus between the inner and outer tube, such as for sustaining a vacuum and/or containing an insulating material.

An annular bridge is any type of junction performed between an inner tube and an outer tube.

According to a first embodiment of the invention, wherein the outer tube is shorter in length compared to the inner tube, the annular bridge defines an outer surface joining an outer peripheral surface of the outer tube to an outer peripheral surface of the inner tube. According to a second embodiment of the invention, wherein the inner tube is shorter in length compared to the outer tube, the annular bridge defines an inner surface joining an inner peripheral surface of the outer tube to an inner peripheral surface of the inner tube.

An annular bridge is made of at least one material, for example a weld material matching the pipe strength and applied using conventional welding technique such as GMAW. Inner and outer tubes may be deformed, with either or both change in their Internal diameter, or outer diameter at their respective opposing ends in order to ease a welding process. In some instances where the radial gap is larger than what a welding process could allow to bridge directly, an additional round piece made of steel such as a spool or spacer ring may be added to provide support for building welds to the inner tube and the outer tube respectively.

The weld may provide a tronconical surface with a 40 to 60 degrees taper with the longitudinal axis of the insulated tubing segment.

According to the first embodiment, wherein the inner tube has an extension extending outwardly from the outer tube, a pin member is provided on the inner tube. According to the second embodiment, wherein the outer tube has an extension extending outwardly from the outer tube, a pin member is provided on the outer tube. The insulated tubing segments are joined by a threaded connection held between a pin member which connects a box member provided either on the second insulated tubing segment or on a coupling jointed to such second insulated tubing segment.

The second insulated tubing segment may be provided with such box member, or in case the second insulated tubing segment is provided with a pin member like the first insulated tubing segment, then the coupling has box members at both ends to join pin members of adjacent first and second insulated tubing segments.

The coupling has opposing first and second threaded box ends, and a central passageway for passing fluid therethrough. The first and second tubing segments are joined by threading the pin end of the first tubing segment with the first box end of the tubular coupling, and threading the pin end of the second tubing segment with the second box end of the tubular coupling.

An insulating sleeve surrounds the joint, the insulating sleeve comprising a first tubular shell adapted to cover at least part of an extension of the first insulated tubular segment, and a second tubular shell overlapping either internally or externally part of the first tubular shell, such that the second tubular shell extends axially about the threaded joint. According to the first embodiment, the first tubular shell covers at least part of that extension outer surface. According to the second embodiment, the first tubular shell covers at least part of that extension inner surface.

The threaded connection or threaded joint corresponds to a location along a longitudinal axis of the first insulated tubing segment, where a thread of that first insulated tubular segment is threadably engaged with the thread of the box member provided either on the second insulated tubing segment or on a coupling jointed to such second insulated tubing segment It is a feature of this invention that the first tubular shell may be adapted to cover at least part of the annular bridge of the first insulated tubular segment. For example, the first tubular shell may comprise a first chamfer adapted to expand over the annular bridge of the first insulated tubular segment such that the first tubular shell covers axially, from either axial side of that annular bridge, parts of both inner tube and outer tube of the first insulated tubing segment.

Preferably, the first tubular shell may be adjacent to the pin member, such that the first tubular shell would not hinder the pin member, and at least would not hinder the male threads of that pin member.

Preferably, the second tubular shell may expand above the box member and may even be longer than the box member.

According to a preferred embodiment of the invention, the insulating sleeve may expand from at least part of the annular bridge of the first tubular segment and up to at least part of an annular bridge of the second tubular segment. Such insulating sleeve provides a continuous thermal insulation in between the two insulated tubing segments where none of them is provided with a double wall and an insulated annulus therebetween. According to that preferred embodiment, a zero axial gap between outer tubes and such insulating sleeve would be reached for the first embodiment of the invention, and a zero axial gap between inner tubes and such insulating sleeve would be reached for the second embodiment of the invention.

Along this preferred embodiment of the invention, the insulating sleeve may even expand such that according to the first embodiment of the invention, it may cover parts of both outer tubes of the first and respectively second insulated tubing segments, and according to the second embodiment of the invention, it may cover parts of both inner tubes of the first and respectively second insulated tubing segments. The insulating sleeve helps to reduce the fin effect around part of the tubes close to the weld of the annular bridge.

Yet another feature is the sleeve may be long enough to extend across the entire exposed portion of the tube joint. One related advantage is that insulation of the tubular assembly is continuous along the otherwise exposed portion of the tube joint between the insulated tubing segments. Another related advantage is the transition from tubing segment, across the sleeve/joint, and to the next tubing segment, may be substantially smooth. Alternatively, the sleeve may be longer, to completely cover and extend beyond the entire exposed portion of the tube joint, substantially overlapping with the annulus of each adjoining insulated tubing segment.

Advantageously, the insulating sleeve may be a two sleeves set when the box member is provided on the second insulated tubing segment, such that the second tubular shell may extend partially around the first tubular shell up to at least part of an outer surface of an extension of the second insulated tubing segment.

Alternatively, the insulating sleeve may be a three sleeves set when the female thread of a box member is provided on a coupling jointed to such second insulated tubing segment, the second insulated tubular segment comprising a second extension with a second pin member thereon, in order to threadably engage such second pin member into another box member of the coupling forming another threaded joint. The insulating sleeve would then comprise a third tubular shell, such that the third tubular shell is adapted to cover at least part of the second extension, the second tubular shell overlapping either internally or externally part of the first tubular shell and also part of that third tubular shell, such that the second tubular shell extends axially about both threaded joints, the second tubular shell extends from the first tubular shell to the third tubular shell. With such three sleeves set configuration of the insulating sleeve, then the second sleeve has a longer axial length than the coupling, in order to expands from both axial ends of such coupling.

According to that alternative embodiment with an insulting sleeve being three sleeves set, the first and the third tubular shells may preferably be identical, especially when insulated tubing segments are of the same type, with identical nominal outer diameter, nominal inner diameter. Diameters of a VIT string can typically extend from 44.5 mm (1.751") as minimum nominal inner diameter and up to 406.4 mm (16") as nominal outer diameter.

According to the invention, before makeup of a string of insulated tubing segments, the first tubular shell may be maintained at one distal end of the first insulated tubing segment by a protector, to be removed at the time of makeup. For example, when the first and the second insulated tubing segments are provided with a pin member at both ends, then before being provided at the rig site, preferably still at the mill site, the first tubular shell is maintained at one end by a protector, and a coupling is provided at the other end of each insulated tubing segment, such that second and third sleeves may be maintained around the coupling by a protector of the coupling, to be removed at the time of makeup.

Preferably, with a three sleeve set's insulative sleeve, prior makeup of the first insulated tubing segment with a coupling, and such coupling with the second insulated tubing segment, the first tubular shell may be force fitted or shouldered against the annular bridge of the first insulated tubing segment, a third tubular shell may be force fitted or shouldered against the annular bridge of the second insulated tubing segment, and the second tubular shell is fitted around the coupling such that the second tubular shell axially expands from the coupling at both axial ends in order to overlap both first and third tubular shells after makeup.

Each tubular shell may comprise a rigid material selected from the group consisting of plastics and metals, for example preferably selected from polymeric materials, expanded or particulate inorganic materials, expanded graphite and mixtures thereof. In case the first tubular shell is fully made of polymeric material, it is preferably shrink fitted around the first extension.

Thus, various polymeric materials may be employed, either alone or in a mixture with fillers. Non-limiting examples of such polymeric materials include biaxially oriented polytetrafluoroethylene, polyurethane, etc. Additionally, the insulating material of the sleeve can be made from expanded exfoliated graphite, as well as from various expanded inorganics such as silicate materials, including vermiculite, etc. When inorganic and mineral materials such as silicates, expanded graphite, etc. are used, they can include reinforcing fillers such as fiberglass, carbon fibers, etc., as well as binders, which can be incorporated and provides the insulating material with structural integrity. A preferred insulating material can comprise an inorganic material such as an expanded silicate, together with a binder, the binder being any one of numerous polymeric materials, both thermoplastic and thermosetting in nature.

For example, each tubular shell may be a unitary tubular body.

Preferably to ease retention on the respective insulated tubing segment, tubular shell may comprise an outer metallic sleeve welded on one of the first or the second insulated tubing segment. Such metallic sleeve may be machined out of metallic tube. According to the first embodiment of the invention, the metallic sleeve may be welded on the outer tube and or the annular bridge. For example, the tubular shell may be a two-layer shell with an inner polymeric core with the outer metallic sleeve around. The polymeric core may be press fit or expanded fit into the metallic sleeve, for example before being welded, or press fit in-between the metallic sleeve and an outer surface of the extension when the metallic sleeve is welded first. That metallic sleeve may also increase the durability of the sleeve, which is especially advantageous when the sleeve is also used as a bumper. The metallic sleeve is for example of aluminum, stainless steel, etc.

The first tubular shell may be fixed at an axial position relative to the annular bridge of the first insulated tubing segment, either shrink fitted about the first insulated tubular segment as the first tubular shell is made of a softer material than the first insulated tubular segment or welded at some point of the first insulated tubular segment.

Preferably to limit production costs of such insulating sleeve, the second tubular shell comprises a substantially uniform wall thickness such that the first tubular shell further comprises a second chamfer to allow overlapping of the second tubular shell over that second chamfer. This option reduces costs, as only the first tubular shell needs a specific inner and outer dimension to adapt respectively to the annular bridge and the second tubular shell.

Thanks to the invention, the insulating sleeve may define an outer diameter within tolerances of + or −5% of the nominal outer diameter of the first or the second insulated tubing segment. Preferably the insulating sleeve is flush within tolerances of the nominal insulated tubular segments dimensions.

The invention also aims an insulated tubular segment adapted to be part of an insulated tubular assembly as defined in the invention, wherein it comprises a protector fitted at one end to maintain a first tubular shell about an extension of such first insulated tubular segment, the protector being removed at the time of makeup.

The invention also aims to a process of insulating an insulated tubular assembly as above mentioned, wherein prior makeup of the first insulated tubing segment with the second insulated tubing segment, the first tubular shell is inserted at a first distal end of the first insulated tubing segment, and the first tubular shell is fitted at a longitudinal position of the extension, and then machined with a specific pattern determined as a function of a distance from a free end of such first insulated tubing segment. This first tubular shell is tuned to length to allow near zero gap between the insulating sleeve and adjacent annular bridges after assembly.

This process allows to optimize fit-up of box member, and optimization of the insulative junction between the first tubular shell and the second tubular shell.

Also, in order to improve thermal insulation, prior makeup of the first insulated tubing segment with the second insulated tubing segment, the second tubular shell may be inserted via a free end of either the second insulated tubing segment or the coupling jointed to such second insulated tubing segment, and the second tubular shell is machined with a specific pattern determined as a function of a distance from that free end. Preferably prior make up, the first insulated tubing segment may be placed with its longitudinal axis vertical, the first tubular shell being retained around the annular bridge even when facing ground, and then threadably engaged with the second insulated tubing itself or the coupling jointed to such second insulated coupling also already vertical.

An optimized process to increase the service life of such insulated tubular assembly may comprise the step to break the thread engagement of the pin member with the box member, the pin member is recut, and another external male thread is machined on the recut pin member, such that the first tubular shell is also machined with a specific pattern determined as a function of a distance from the newly recut free end. Thus the first tubular shell is again tuned to length to allow near zero gap between the insulating sleeve and adjacent annular bridges after assembly.

BRIEF DESCRIPTION OF THE DRAWINGS

FIGS. 4 to 6 differ from each as how the insulating sleeve is constructed to surround the insulated joint.

DETAILED DESCRIPTION OF THE PREFERRED EMBODIMENTS

Figure 2:
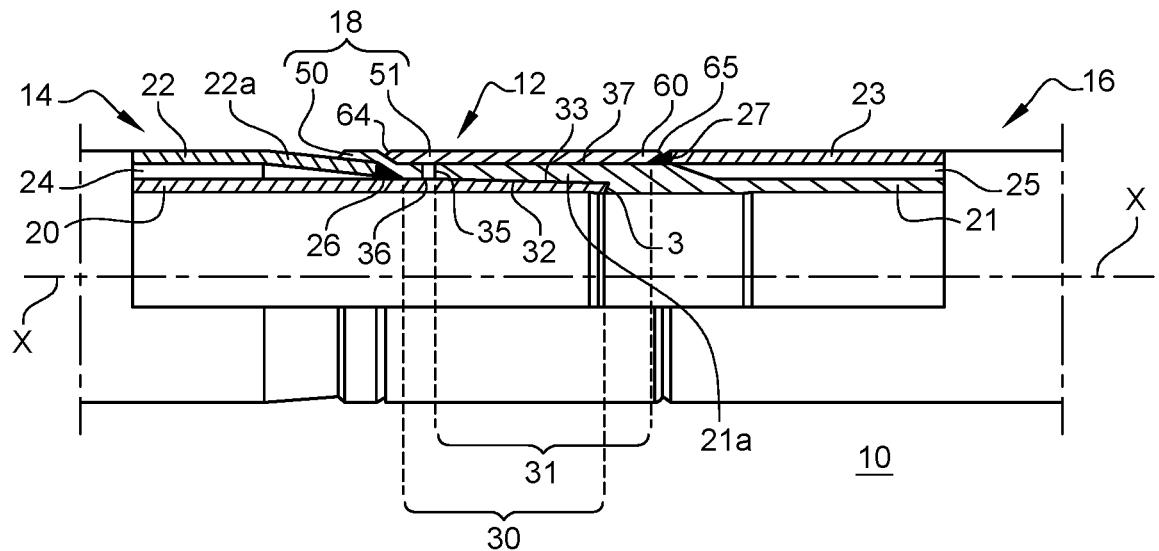
FIGS. 2 and 3 illustrate an embodiment of the tubular assembly, in which the joint comprises a male thread on a first insulated tubular segment coupled with a female thread of a second insulated tubular segment. An insulating sleeve according to the invention surrounds the joint.

FIG. 2 shows an embodiment of an insulated tubular assembly 10, having a connection 12 between two insulated tubing segments 14, 16. An insulating sleeve 18 surrounds the connection 12. Each insulated tubing segment 14, 16 has a double-walled insulated construction, which includes an inner tube 20, 21, an outer tube 22, 23 concentrically disposed about the inner tube 20, 21 and an annulus 24, 25 between the inner tube 20, 21 and the outer tube 22, 23. Each end of each tubing segment 14, 16 has an annular bridge 26, 27, which connects the inner tube 20, 21 to the outer tube 22, 23. The annular bridge 26, 27 may be a fillet weld joining the outer tubes 22, 23 respectively, to inner tubes 20, 21, eventually on swaged portion like 22a or expanded or upsetted portion like 21a, to seal an annulus 24, 25 from atmosphere. The annulus 24, 25 may thereby sustain a vacuum and/or contain an insulating material, to insulate each tubing segment 14, 16.

The inner tube 20, 21 of tubing segments 14, 16 each have an extension 30, 31 extending outwardly from at least one end of each tubing segment 14, 16. For example, the extensions 30, 31 may be portions of the inner tubes 20, 21 that extend beyond the bridges 26, 27, respectively. A threaded connection connects the extension 30 with the extension 31. In FIG. 2, this threaded connection includes a male thread or "pin" 32 on extension 30, and a female thread or "box" 33 on extension 31. Thus, the tubing segments 14, 16 may be threadably joined to form an integral connection 12. The pin 32 has a smaller axial length than the extension 30, and similarly the box 33 has a smaller axial length than the extension 31 compared to an axial longitudinal axis of the assembly X. The pin 32 is closer to a free end 34 of such extension 30 of the first insulated tubular segment 14, such that a non-threaded portion 36 is defined between the pin 32 and the annular bridge 26. The box 33 being provided on an inner surface of such extension 31, an outer surface 37 of such extension 31 is non threaded between a free end 35 of such extension 31 and the annular bridge 27.

Threaded connection of the extension 30 may further include, in addition to the thread, sealing surface and or shoulder surface which will be in contact with corresponding surfaces of the threaded connection of the extension 31.

Machining of the treaded portion on the extension 30 is performed at a predetermined location from the free end 34. Machining is preferably performed as of the free end 34.

A conductive flow path occurs where the inner tube 20, 21 meets the outer tube 22, 23 of each tubing segment 14, 16. Thus, despite the insulating properties of tubing segments 14, 16 about the annulus 24, 25, excessive heat transfer may occur where the insulated tubing segments are with a single wall, especially in between the annular bridges 26 and 27, and even more at the connection 12 location. To minimize heat loss at that location, the insulating sleeve 18 is provided about the connection 12.

The insulating sleeve 18 comprises a first tubular shell 50 adapted to cover at least part of the extension 30 of the first insulated tubular segment and a second tubular shell 51 overlapping externally part of the first tubular shell 50, such that the second tubular shell extends axially about the threaded joint 12.

FIG. 2 the first tubular shell 50 expand over the annular bridge 26 of the first insulated tubular segment, such that the first tubular shell 50 expand from both axial side of that annular bridge 26 and covers parts of both inner tube 20 and outer tube 21 of the first insulated tubing segment.

Figure 1A:
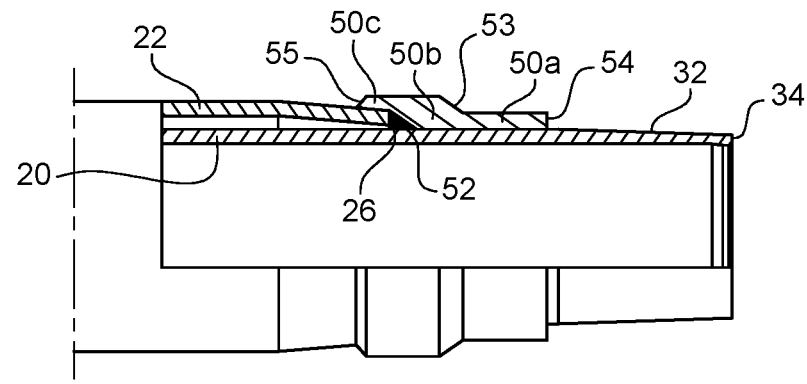
FIGS. 1a to 1d illustrates different embodiments of a first insulated segment end part of a tubular assembly according to the invention

FIG. 1a the first tubular shell 50 comprises a first chamfer 52 on its inner surface adapted to shoulder on the annular bridge 26. The first tubular shell 50 comprises a first portion 50a, a transition portion 50b comprising that chamfer 52 and a second portion 50c adapted to cover the swaged portion of the outer tube 22. The second portion 50c may be tronconical. The first portion 50a of the embodiment of FIGS. 1a and 2 is cylindrical. To increase reliability and effectiveness of the insulation, the first tubular shell 50 may extend beyond the connection to substantially overlap the annulus 24 within the first insulated tubing segment 14.

The first tubular shell is fully made of one material, for example a polymeric material like PTFE.

Preferably the first tubular shell 50 is shrink fitted on the first insulated tubing segment 14. With the shrink fit process, the first tubular shell has its internal shape adapted to the outer geometry provided at the annular bridge 26 and axially around.

As shown at FIG. 1a of the first insulated tubing segment of FIG. 2, an outer diameter of the first cylindrical portion 50a is inferior to an outer diameter of the second portion 50c, and a second chamfer 53. Preferably, the outer diameter of the second portion is below the outer diameter of the outer tube 22, or within tolerance of +/−5% of nominal accepted outer diameter dimension for that outer tube 22, 23. Transition portion 50b is held between first chamfer 52 and second chamfer 53. An outer diameter of the sleeve may be less than or substantially equal to that of adjacent tubing segments, such that the sleeve is protected from damage as the tubular assembly is moved within the well. Alternatively, the outer diameter of the sleeve may be greater than that of adjacent tubing segments, to radially space the tubing segments from the well bore, thereby acting as a bumper to protect the tubular assembly.

According to a preferred process of insulating an insulated tubular assembly of the invention, the first tubular shell is maintained at some fixed axial location around the extension 30, and then the extension 30 is machined in order to provide thereon the threaded connection. Preferably the first tubular shell 50 is also prevented from rotation around the longitudinal axis X, under forces not exceeding machining forces of cutting tools, in order to allow machining of the first tubular shell 50 when already in place on the extension 30.

The first insulated shell is machined with the same lathe, and even preferably with the same machining tool in order to machine the outer surface of the first portion 50a and the second chamfer 53. The advantage of using a same lathe is that tolerances can be kept extremely small for the first tubular shell structure, even if machining tools are changed within the lathe. A first distal end 54 of the first insulated shell 50 oriented toward the free end 34 of the extension 30 may also be machined in order to have a controlled distance between the first distal end 54, the second chamfer 53 and the free end of the extension 30.

Figure 1B:
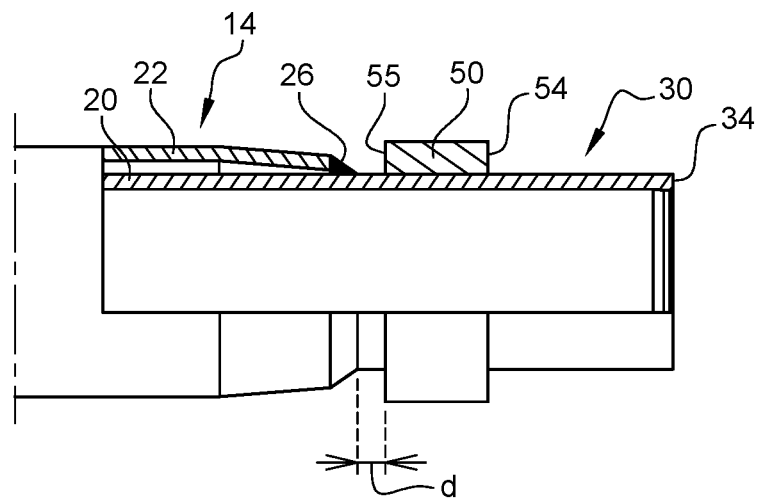
Figure 1C:
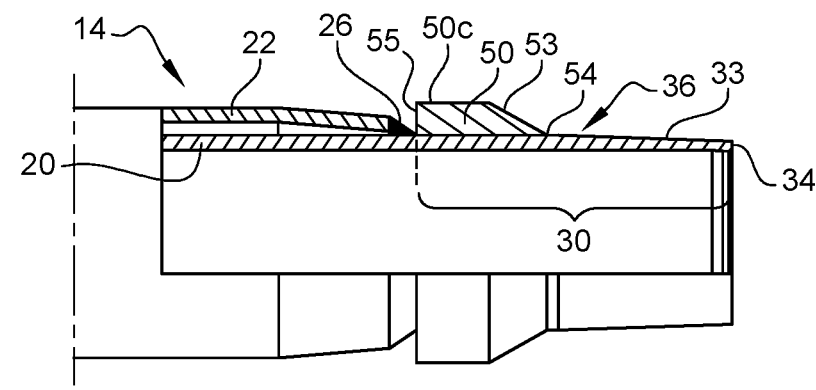

As shown on alternative embodiments of the invention, the first tubular shell 50 may be at a non-zero axial length d from the annular bridge 26, as shown in FIG. 1b, or shouldering such annular bridge 26 without covering the annular bridge 26, as shown on FIG. 1c. FIG. 1b represents the extension 30 before the pin 33 is machined thereon. The first tubular shell 50 may have concentrically inner and outer walls before machining step. FIG. 1b, walls of the first tubular shell 50, is not machined yet. FIG. 1c, the first tubular shell 50 is not having any first chamfer to adapt the annular bridge 26. The first tubular shell of FIG. 1c presents a second chamfer 53 extending up to the first distal end 54. Thus, the first portion 50a and transition portion 50b are a unique portion according to FIG. 1c.

For all embodiments of the first tubular shell, an outer diameter at the first distal end 54 is preferably lower than an outer diameter at the second distal end 55 of such first tubular shell 50, opposite to the first distal end 54.

According to an alternative process of insulating an insulated tubular assembly of the invention, the first tubular shell 50 is maintained at that axial position after having been force fitted.

According to another alternative process of insulating an insulated tubular assembly of the invention, the first tubular shell 50 is maintained at that axial position after having been welded at the second distal end 55 to the outer tube 22.

Figure 1D:
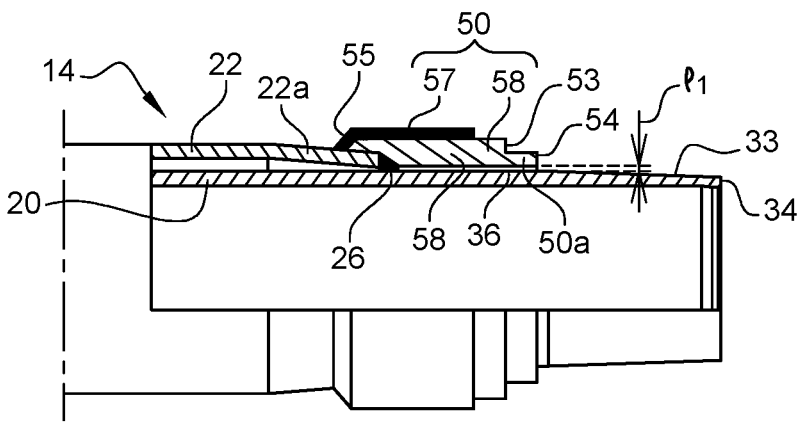

In that case, like at FIG. 1d, the first tubular shell 50 comprises an outer metallic sleeve 57 and a polymeric core 58, the metallic sleeve 57 being welded to the outer tube 22 or the annular bridge 26, the polymeric core 58 being preferably expanded fit into the metallic sleeve 57 prior welding, liquid nitrogen being used for expanded fit process. As shown FIG. 1d, a radial gap el may be defined between an outer diameter of the non-threaded portion 36 of the extension 30 and an inner surface of the polymeric core 58. Alternatively, the polymeric core 58 may be force fitted in between the non-threaded portion 36 of the extension 30 and the outer metallic sleeve. The polymeric core 58 is longer than the metallic sleeve 57 such that the polymeric core is sole defining the first distal end 54.

According to that alternative process, the polymeric core 58 is machined with a same tool as the one used to machine the pin 33 on the extension 30, such that the first distal end 54 and outer diameter of the polymeric core are at a predetermined position from the free end 34 of the extension 30. In case the polymeric core 58 is shorter than the metallic sleeve 57 before machining, then that same tool is also able to machine the metallic sleeve 57 in order to obtain that the polymeric core 58 is sole defining the first distal end 54. The polymeric core 58 is provided with a first portion 50a up to the second chamfer 53, the second chamfer being here a radial shoulder.

Prior make up of an assembly according to the invention a protector, not shown, is threaded on the pin 33 in order to protect the pin 33 before is made up at the rig site.

FIG. 2, the outer surface 37 of the extension 31 of the second insulated tubular segment 16 is covered by a second tubular shell 60. The second tubular shell 60 is of cylindrical shape with a first distal end 64 extending beyond the free end 35 of the extension 31. Opposite to the first distal end 64, the second tubular shell comprises an opposite distal end 65 close to the annular bridge 27. According to that embodiment the second tubular shell overlaps at least part of that annular bridge 27. To increase reliability and effectiveness of the insulation, the second tubular shell 60 may extend beyond the connection to substantially overlap the annulus 25 within the second insulated tubing segment 16. Nevertheless, within the scope of the invention, that opposite distal end 65 may also be at a non-zero axial distance from the annular bridge 27. But in order to lower heat loss, it is preferred to have a lower gap between the second tubular shell 60 and that annular bridge 27, even preferably that the second tubular shell 60 fully overlaps that annular bridge 27 and also covers part of the outer tube 23.

Preferably, the outer diameter of the second tubular shell 60 is below the outer diameter of the outer tube 23, or within tolerance of +/−5% of nominal accepted outer diameter dimension for that outer tubes 20, 22. An inner diameter of such second tubular shell 60 is such that it is preferably superior or equal to the outer diameter of the first portion 50a. Alternatively an interference fit between first and second tubular shoulder 50, 60 may be acceptable when they are made of polymeric material.

When pin 33 and box 34 are made up in order to obtain a threaded joint, the free end 35 of the extension 31 remains away from the first distal end 54 of the first tubular shell 50, but the part of the second tubular shell 60 overlaps at least one of the first portion 50a and the second chamfer 53. At the time of makeup, the second tubular segment 16 is vertical, and the box 33 is facing up, whereas the first tubular segment 14 is also vertical but with the pin 32 facing ground; the second tubular shell 60 is already around the extension 31, either shouldering the annular bridge 27 under gravity forces, or fixed at some axial location. Process of assembly includes the step of lowering and stabbing the first tubular segment in the direction of the second tubular segment 16, and thread pin and box together. While making up, the first tubular shell 50 progressively partly fits inside the annular volume provided by the second tubular shell 60.

Thus, the insulating sleeve of the invention comprising such first tubular shell 50 and second tubular shell 60 provides a continuous thermal insulation.

Figure 3:
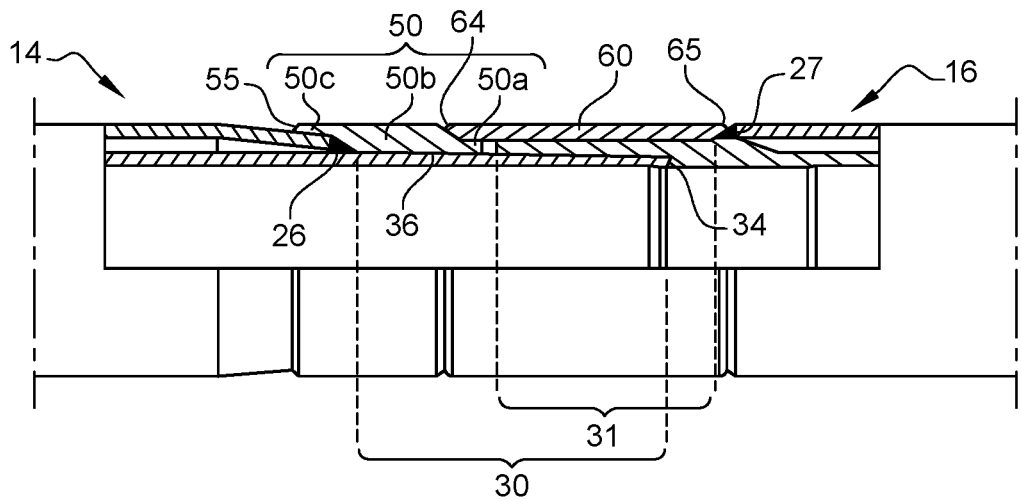

FIG. 3 shows a slight variation of the embodiment of FIG. 2, where the extension 30, the non-threaded portion 36, the first tubular shell 50 and especially the transition portion 50b are longer than those of the FIG. 2, for example longer of about 30 to 130 mm, around 50 mm. With a first insulated tubular segment 14 of FIG. 3, service life is improved, as this assembly may be used for some time in a well, and then, when it is removed from the well for maintenance, joints are broken apart, and the extension 30 provides enough length to recut a new pin 32 and a new free end 34, while the first tubular shell is still around the non-threaded portion 36, it will be possible to shorten the length and reshape the first tubular shell 50 according to a required distance with the recut free end 34. With no need to adjust the shape of the second tubular shell 60, it will be possible to provide a new assembly with the recut first tubular segment 14. The first tubular shell 50 may further be reduced in length in case the box 33 is also recut on the second tubular segment 31.

Alternatively and or in addition, the second tubular shell 60 could also be recut in length with a machining tool at the time of recut of the box 33, but it would require to prevent that second tubular shell from any axial nor rotational movement about the outer surface 37.

The second tubular shell 60 may be provided with a radial gap with the outer surface 37 or shrink fitted around that outer surface 37. When the second tubular shell 60 is placed around the outer surface 37 with a radial gap, then a female protector provided at the free end 35 manage the retention of that second tubular shell 60 around the extension 31 up to a rig site, where that female protector will be removed to allow makeup of the assembly according to the invention. Alternatively, the second tubular shell may be provided separately and placed at the free end 35 only at the rig site.

FIGS. 4 to 7 illustrate other embodiments of the tubular assembly 110 having a T&C connection 112. Like tubing segments 14, 16 of tubular assembly 10, tubing segments 114, 116 have inner tubes 120, 121, outer tubes 122, 123, and annuli 124, 125 therebetween for sustaining a vacuum and/or contain an insulating material. Annular bridges in the form of frustoconical thrust rings 126, 127 connect, by welding at both ends, the inner tubes 120, 121 with respective outer tubes 122, 123 to close off the annulus to atmosphere. Tubing segments 114, 116 have extensions 130, 131 on at least one end of each tubing segment 114, 116. The extensions 130, 131 may be portions of the inner tubes 120, 121 that extend beyond the bridges 126, 127.

Contrary to embodiments of FIGS. 2 and 3, both extensions 130 and 131 of FIGS. 4 to 7 are provided with a male threaded connection with respective pin 132 and 133 thereon. Extension 130 and 131 are preferably with the same male threaded portion thereon.

The connection 112 of tubular assembly 110 comprises a tubular coupling 180 for receiving extensions 130, 131 of tubing segments 114, 116. Tubular coupling 180 has threaded box ends 187 and 188, which mate with respective pin threads 132 and 133, to join tubing segments 114, 116.

Figure 4:
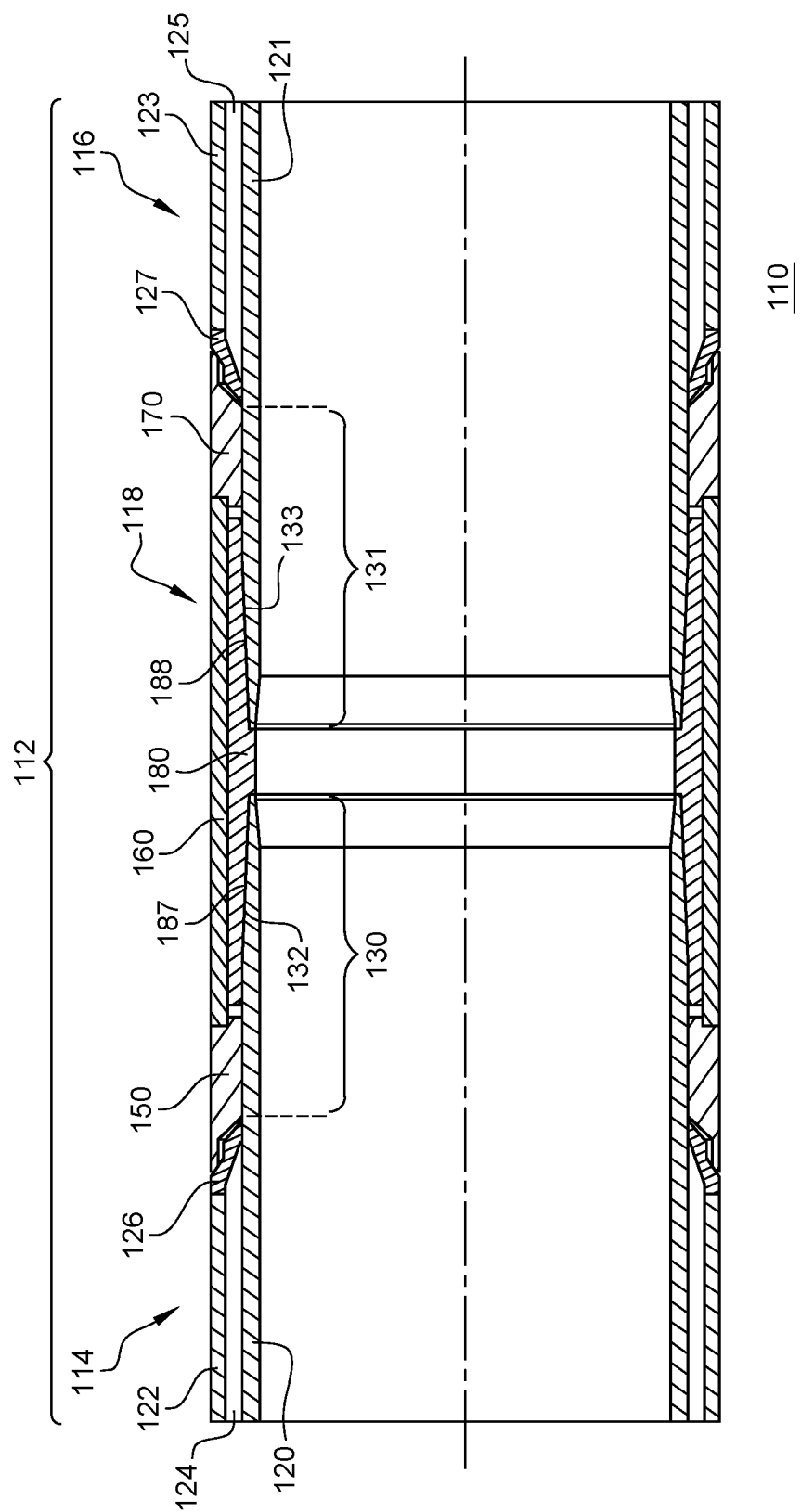
FIGS. 4 to 6 illustrate an alternate embodiment of the tubular assembly, in which the joint comprises a threaded coupling provided with two box ember joining respectively male threaded ends of two tubular segments.
Figure 5:
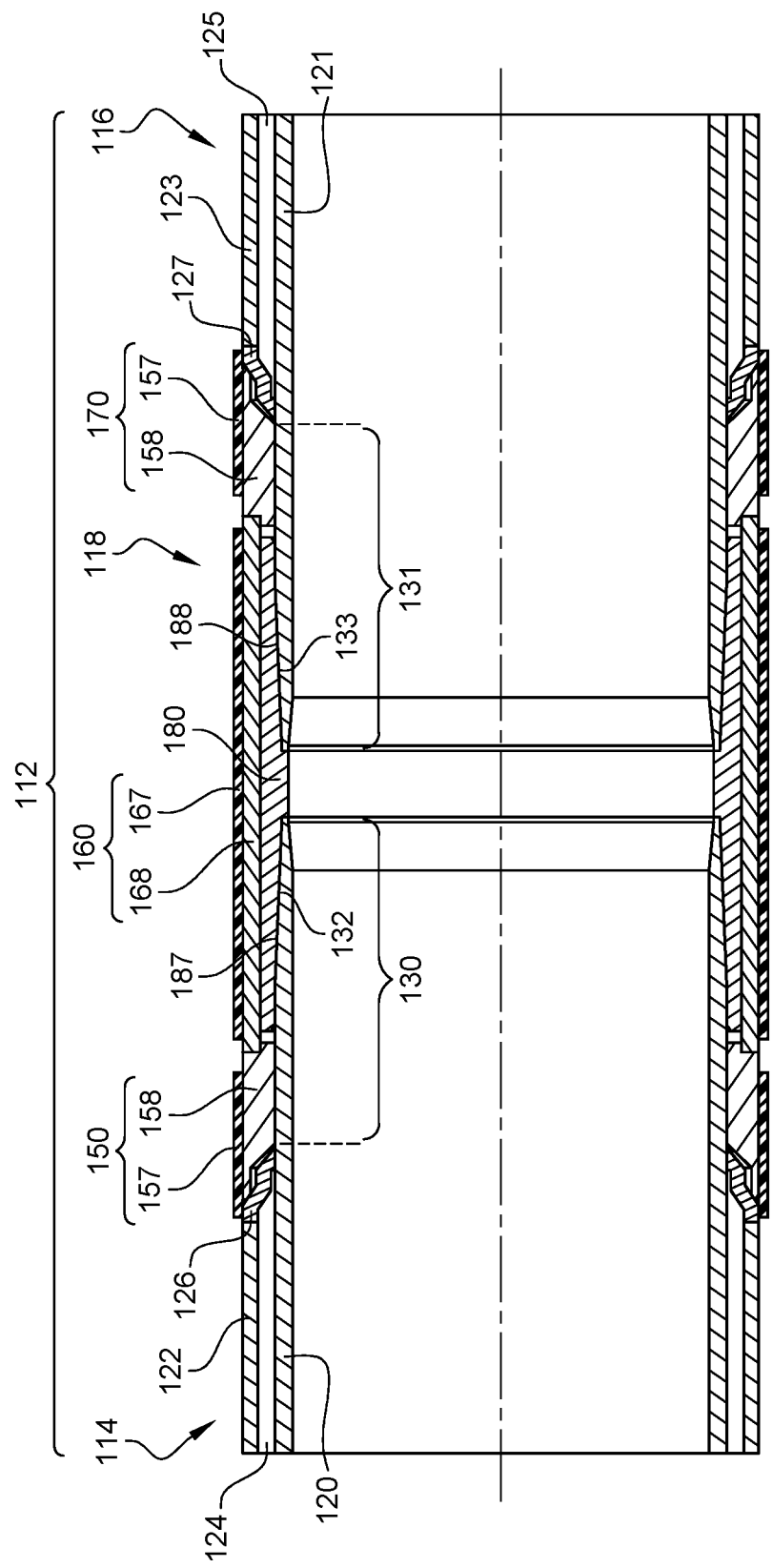
Figure 6:
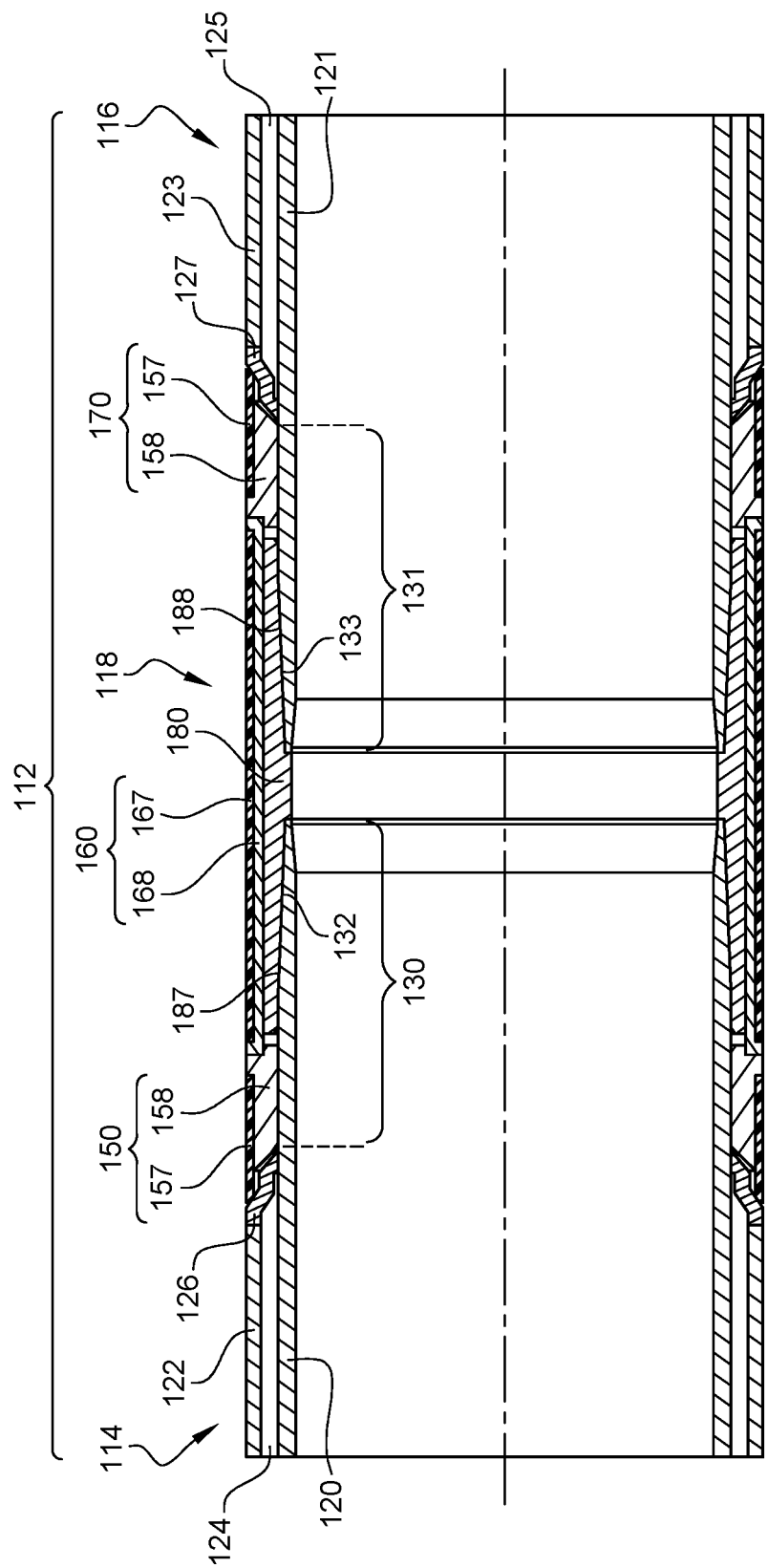

Like the tubular assembly 10 in FIG. 2, the tubular assembly 110 in FIGS. 4 to 6 includes an insulating sleeve 118 to insulate the connection 112. The sleeve 118 comprises a first tubular shell 150 on the first extension 130, a second tubular shell 160 covering the coupling 180 and a third tubular shell 170, identical to the tubular shell 150, on the second extension 131.

The sleeve 118 surrounds the connection 112 to insulate the connection 112 and insulate both joints between pin 132 and a first box 187 end of the coupling and the second joint between pin 133 and second box end 188 of the same coupling 180.

The sleeve of a tubular assembly preferably extends across an entire connection such that the insulation of the tubular assembly may be substantially continuous along the tubular assembly, i.e., from one insulated tubing segment, across a connection, to a next tubing segment.

The second tubular sleeve 160 extends beyond both free ends of the coupling 180 such that the second tubular sleeve 160 externally overlaps both first and third tubular shells 150 and 170.

Preferably, each tubular shell 150, 160 and 170 has a rigid or unitary "one-piece" construction. FIG. 4, each tubular shell is a one-piece construction made of a single material, for example all out of a same material. FIG. 4, the second tubular shell 160 is shrink fitted or force fitted around the coupling 180. Alternatively, the second tubular shell 160 may be free to rotate around the coupling 180. According to this alternative solution, the second tubular shell 160 may also be free to slide longitudinally between the first and third tubular shells, to the extent a longitudinal tolerance allows such sliding movement.

Alternatively, this unitary tubular shell may have a separate inner core like 58 and an outer metallic sleeve like 57. FIG. 5, tubular shells 150 and 170 are identical to the one described in connection with FIG. 1d. For the embodiment of FIG. 5, the second tubular shell 160 comprises a metallic sleeve 168 and a polymeric core 167, such that the polymeric core extends axially beyond the metallic sleeve 168 at both ends, and the polymeric core 167 overlaps the polymeric cores 157 of both first and third tubular shells 150 and 170. As a slight difference with FIG. 1d, metallic sleeve 157 are respectively welded to the annular thrust rings 126 and 127.

Second tubular shell 160 may alternatively be slidably mounted around the coupling 180 with a radial gap accepted between an outer surface of the coupling and an inner diameter of the second tubular shell.

FIG. 6 is an alternative of FIG. 5 in that sense that the metallic sleeves 157 and 167 are embedded in their respective polymeric cores 158 and 168, in order to reduce the outer diameter of the insulation sleeve formed by the first, second and third tubular shell overlapping each other. Moreover, maximum outer diameter is provided by polymeric cores 158, 168. Metallic Sleeves 157 and 167 are flush with maximum outer diameter provided by the polymeric cores 158, 168.

Figure 7:
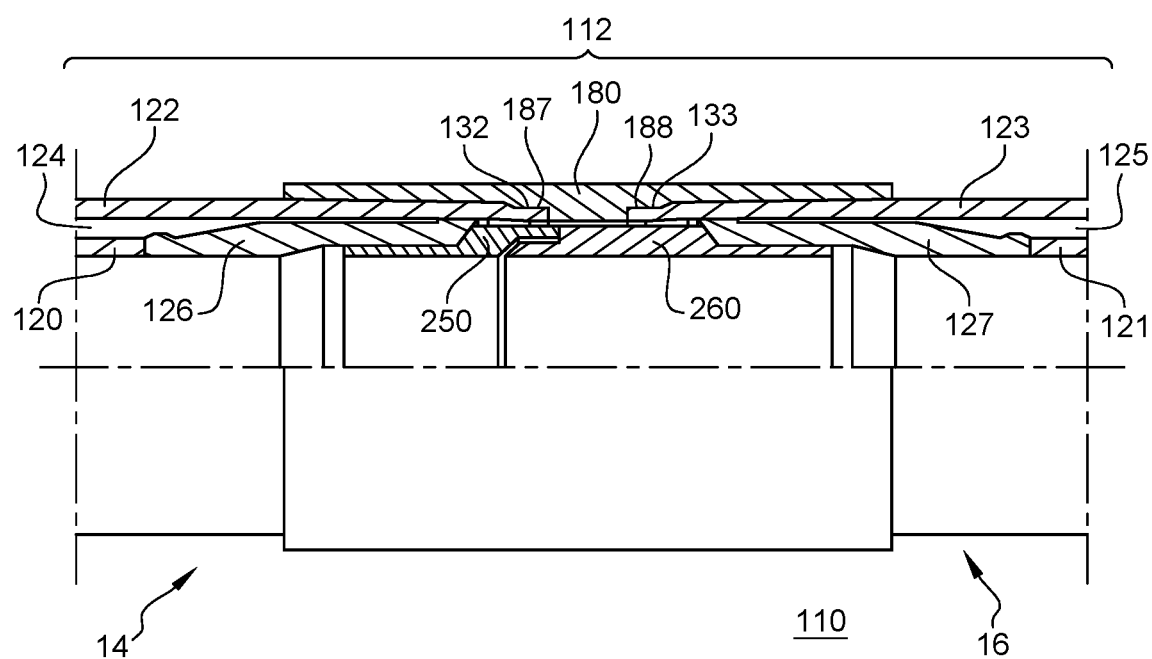
FIG. 7 illustrates an alternate joint according to a second embodiment of the invention in which the outer tubes have threaded extensions for joining insulated tubing segments, and the insulating sleeve being internal to the tubular assembly.

FIG. 7 is an alternative embodiment of FIGS. 4 to 6 as extension 130 and 131 are provided by outer tubes 122, 123. Extension 130 and 131 are still provided with pin 132 and 133 thereon to respectively joint box ends of a coupling 180. But according to this embodiment, the insulating sleeve comprises a first inner tubular shell 250 and a second inner tubular shell 260. The first inner tubular shell 250 is inserted along an inner surface of the extension 130, and the second inner tubular shell is provided along an inner surface of the extension 131, such that when joints are made up, one of the inner tubular shells 250, 260 overlaps the other one. Preferably a maximum inner diameter of those inner tubular shells 250 and 260 is higher than an inner diameter of the inner tubes 120, 121. Maximum inner diameters of those inner tubular shells 250 and 260 may be equal.

A string may be assembled as long as necessary from a plurality of insulated tubing segments, such as to reach from the earth's surface to an underground reservoir. Each insulated tubing segment may have an extension at each of two opposing ends, such that a connection may be formed at each end of the tubing segment. An insulating sleeve may be installed at each connection, such that the tubular assembly is continuously insulated along its length, without interruption at each connection.

It will be understood by those skilled in the art that the embodiment shown and described is exemplary and various other modifications may be made in the practice of the invention. Accordingly, the scope of the invention should be understood to include such modifications which are within the spirit of the invention.

The invention claimed is:

1. An insulated tubular assembly comprising:
two jointed insulated tubing segments, a first insulated tubing segment and a second insulated tubing segment, each insulated tubing segment comprising an inner tube defining an inner passage adapted for conveying fluids;
an outer tube concentrically disposed about and defining an annulus with said inner tube;
an annular bridge at each opposing end of the insulated tubing segments, each annular bridge connecting said inner tube with said outer tube such that one of the inner tube and the outer tube is longer than the other, the longer forming an extension extending outwardly at one end of a first insulated tubing segment such that a pin member having an external male thread is formed thereon for threadably engaging a female thread of a box member provided either on the second insulated tubing segment or on a coupling jointed to such second insulated tubing segment, pin and box member being jointed in order to form a threaded joint between said first and second insulated tubing segments; and
an insulating sleeve, wherein the insulating sleeve comprises a first tubular shell adapted to cover at least part of the extension of the first insulated tubular segment and a second tubular shell overlapping either internally or externally part of the first tubular shell, such that the second tubular shell extends axially about the threaded joint,
wherein said first tubular shell is adapted to cover at least part of the annular bridge of the first insulated tubular segment, and
wherein said first tubular shell comprises a first chamfer adapted to expand over the annular bridge of the first insulated tubular segment, and the first tubular shell covers axially, from either axial side of that annular bridge, parts of both inner tube and outer tube of the first insulated tubing segment.

2. The insulated tubular assembly as defined in claim 1, wherein said first tubular shell is adjacent to the pin member.

3. The insulated tubular assembly as defined in claim 1, wherein said second tubular shell expands above the box member, such that it is longer than the box member.

4. The insulated tubular assembly as defined in claim 1, wherein said insulating sleeve expands from at least part of the annular bridge of the first tubular segment and up to at least part of an annular bridge of the second tubular segment.

5. The insulated tubular assembly as defined in claim 1, wherein the female thread of a box member is provided on the second insulated tubing segment and the second tubular shell extends partially around the first tubular shell and up to an outer surface of an extension of the second insulated tubing segment.

6. The insulated tubular assembly as defined in claim 1, wherein the female thread of a box member is provided on a coupling jointed to such second insulated tubing segment, the second insulated tubular segment comprising a second extension with a second pin member thereon, in order to threadably engaged such second pin member into another box member of the coupling forming another threaded joint, and the insulating sleeve comprises a third tubular shell such that the third tubular shell is adapted to cover at least part of the second extension, the second tubular shell overlapping either internally or externally part of the first tubular shell and also part of that third tubular shell, such that the second tubular shell extends axially about both threaded joints, the second tubular shell extends from the first tubular shell to the third tubular shell.

7. The insulated tubular assembly as defined in claim 6, wherein the first and the third tubular shells are identical.

8. The insulated tubular assembly as defined in claim 6, wherein the first and the second insulated tubing segments are provided with a pin member at both ends, such that prior make up of such assembly, the first tubular shell is maintained at one end by a protector, to be removed at the time of makeup, and the coupling and second and third tubular shells are provided at one end of the second insulated tubular assembly; second and third tubular shells being maintained by another protector of the coupling, also to be removed at the time of makeup.

9. The insulated tubular assembly as defined in claim 1, wherein each tubular shell comprises: a rigid material selected from the group consisting of plastics and metals.

10. The insulated tubular assembly as defined in claim 9, wherein said first and or second tubular shell comprises an outer metallic sleeve welded on one of the first or the second insulated tubing segment.

11. The insulated tubular assembly as defined in claim 1, wherein each tubular shell is respectively a unitary tubular body.

12. The insulated tubular assembly as defined in claim 1, wherein the second tubular shell comprises a substantially uniform wall thickness such that the first tubular shell further comprises a second chamfer to allow overlapping of the second tubular shell over that second chamfer.

13. The insulated tubular assembly as defined in claim 1, wherein the insulating sleeve defines an outer diameter within + or −5% of the nominal outer diameter of the first or the second insulated tubing segment.

14. The insulated tubular assembly as defined in claim 1, wherein the first tubular shell is fixed at an axial position relative to the annular bridge of the first insulated tubing segment, either shrink fitted about the first insulated tubular segment as the first tubular shell is made of a softer material than the first insulated tubular segment or welded at some point of the first insulated tubular segment.

15. A first insulated tubular segment adapted to be part of the insulated tubular assembly as defined in claim 1, the first insulated tubular segment comprising a protector fitted at one end to maintain a first tubular shell about an extension of that first insulated tubular segment, the protector being removed at the time of makeup.

16. A process of insulating the insulated tubular assembly as defined in claim 1, comprising:
attaching, prior to a makeup of the first insulated tubing segment with the second insulated tubing segment, the first tubular shell to a first end of the first insulated tubing segment by fitting the first tubular shell at a longitudinal position of the extension of the first insulated tubing segment; and then
machining the first tubular shell with a specific pattern determined as a function of a distance from a free end of that first end.

17. A process of insulating the insulated tubular assembly as defined in claim 1, comprising:
attaching, prior to a makeup of the first insulated tubing segment with the second insulated tubing segment, the second tubular shell to a free end of either the second insulated tubing segment or the coupling jointed to such second insulated tubing segment; and
machining the second tubular shell with a specific pattern determined as a function of a distance from that free end.

18. A method of assembly of the insulated tubular assembly as defined in claim 1, comprising:
arranging, prior to a make up, the first insulated tubing segment to be vertical;
retaining the first tubular shell around the annular bridge of the first insulated tubing segment and then
threadably engaging the first insulated tubing segment with the second insulated tubing or with the coupling jointed to such second insulated coupling while the second insulating tubing segment is vertical.

19. A process of insulating the insulated tubular assembly as defined in claim 1, comprising:
breaking a thread engagement of the pin member with the box member;
recutting the pin member; and
machining another external male thread on the recut pin member, such that the first tubular shell is also machined with a specific pattern determined as a function of a distance from the newly recut free end.

* * * * *